United States Patent [19]

Okura

[11] 4,114,896
[45] Sep. 19, 1978

[54] PHONOGRAPHIC PICK-UP CARTRIDGE

[75] Inventor: Keniti Okura, Tokorozawa, Japan

[73] Assignee: Pioneer Electronic Corporation, Tokyo, Japan

[21] Appl. No.: 764,619

[22] Filed: Feb. 1, 1977

[30] Foreign Application Priority Data

Feb. 2, 1976 [JP] Japan ............................ 51-10138

[51] Int. Cl.$^2$ .................... G11B 3/02; H04R 1/16; H01S 4/00
[52] U.S. Cl. ............................ 274/37; 29/592 R; 179/100.41 R; 179/100.41 K
[58] Field of Search ............... 274/37; 179/100.41 K, 179/100.41 M, 100.41 R; 29/592

[56] References Cited

U.S. PATENT DOCUMENTS 3,720,796   3/1973   Honma ........................... 274/37

Primary Examiner—Steven L. Stephan
Attorney, Agent, or Firm—Sughrue, Rothwell, Mion, Zinn and Macpeak

[57] ABSTRACT

A phonographic pick-up cartridge comprises a wire 15 mounted in an elongated, shouldered cylindrical sleeve 8 disposed in a mating cylindrical cavity in a stylus support 7, the forward end of the wire extending through a resilient, compressively stressed damper ring 6 and being secured to the rear end of a cantilevered stylus arm 18. The support 7 may be diagonally split and hinged along one edge, or formed with a recess 24 and mating insert piece 25, and is closed over the sleeve 8 during assembly. By properly dimensioning the components the damper ring is appropriately stressed during assembly, and no initial wire tensioning adjustment is necessary.

12 Claims, 3 Drawing Figures

FIG. 1 PRIOR ART
FIG. 2
FIG. 3(a)
FIG. 3(b)
FIG. 3(c)
FIG. 3(d)
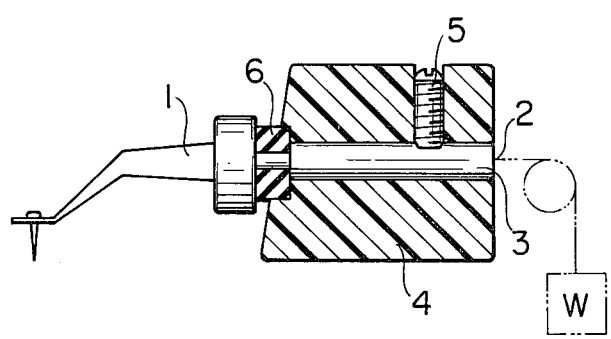
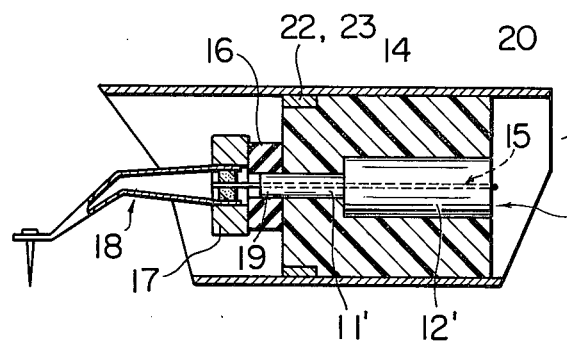
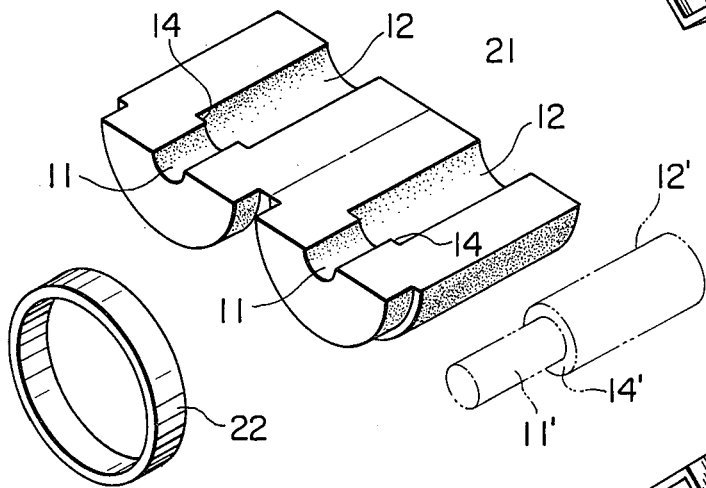
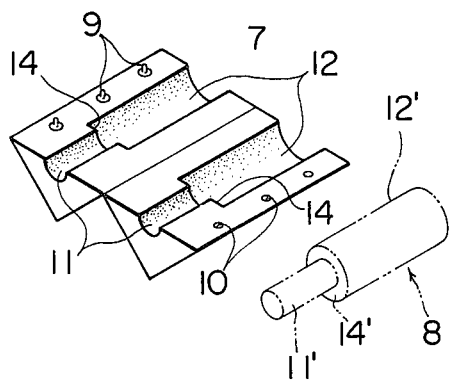
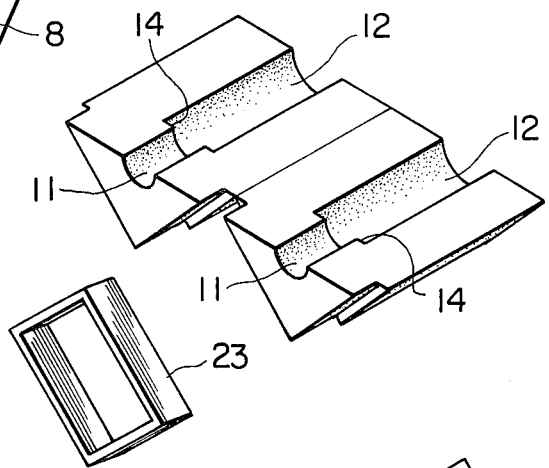
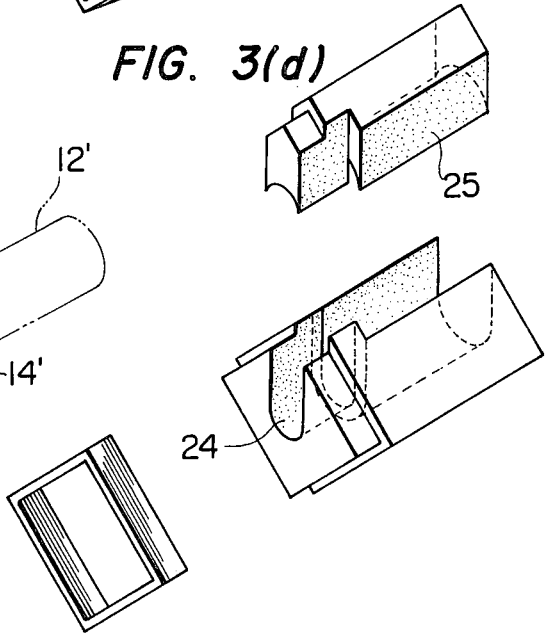

PHONOGRAPHIC PICK-UP CARTRIDGE

BACKGROUND OF THE INVENTION

1. Field of the Invention

This invention relates to a phonographic pick-up cartridge construction employing a pre-dimensioned stylus arm support wire and mounting means therefor.

2. Description of the Prior Art

Among the components of a record player, the pick-up system, i.e., the tonearm and pick-up cartridge, has the greatest influence on the quality of the reproduced sound.

Conventional pick-up cartridges may be broadly divided into the moving magnet (MM), moving iron (MI), and moving coil (MC) types. The present invention is concerned with an improved pick-up cartridge of the former two types, particularly of the kind wherein the vibrating system is supported by a tensioned wire extending through and compressing a rubber damper disposed at the forward end of the cartridge.

In conventional pick-up cartridges of this kind, the support wire is connected to a cantilevered stylus arm, and is secured to the stylus support by a set screw. To place the rubber damper in operational readiness, it is necessary to first apply a compressive stress thereto.

Specifically, as shown in FIG. 1, one end of a wire 2 is secured to the end portion of a cantilevered stylus arm 1. The other end of the wire extends into and is fixed within a sleeve 3 mounted in a stylus support 4. An adjustment screw 5 is threaded into the stylus support to axially fix the sleeve in the support. During assembly, a predetermined tension W is applied to the wire, the sleeve 3 is pinched or clamped in position in the support 4 with the screw 5, and the excess wire extending out of the sleeve is cut off. In this manner, an initial compressive stress is applied to the resilient damper member 6 disposed between the stylus arm and the support.

Such a pick-up cartridge, however, comprises a number of minute parts whereby the fabricating process is complicated, and substantial time is required to accomplish the initial tension control operation for each individual pick-up cartridge.

Further, the stylus support is relatively costly due to the necessary dimensional accuracy thereof. It is typically manufactured on a lathe out of a brass block, and must be provided with an opening for the sleeve 3, a threaded aperture for the screw 5, and a smooth outer surface. These fabricating operations are all manually effected, thereby resulting in wide tolerance variations and a high reject ratio.

SUMMARY OF THE INVENTION

Taking the above-described disadvantages into consideration, the present invention provides a pick-up cartridge construction wherein a constant tension is imparted to the stylus arm support wire without the necessity of any initial, individual tension adjustment after the completion of the cartridge assembly, and wherein a constant compressive stress is thus applied to the rubber damper ring.

Briefly, and in accordance with the present invention, a phonographic pick-up cartridge comprises a wire mounted in an elongated, shouldered cylindrical sleeve disposed in a mating cylindrical cavity in a stylus support, the forward end of the wire extending through a resilient, compressively stressed damper ring and being secured to the rear end of a cantilevered stylus arm. The support may be diagonally split and hinged along one edge, or formed with a recess and mating insert piece, and is closed over the sleeve during assembly. By properly dimensioning the components the damper ring is appropriately stressed during assembly, and no initial wire tensioning adjustment is necessary.

BRIEF DESCRIPTION OF THE DRAWINGS

In the drawings:

FIG. 1 shows a sectional view of a prior art pick-up cartridge,

FIG. 2 shows a sectional view of a pick-up cartridge according to the present invention, FIG. 3(a) shows a perspective view of the opened stylus support and wire sleeve according to a first embodiment of the invention, FIG. 3(b) shows a perspective view of the opened stylus support, wire sleeve, and stopper ring according to a second embodiment of the invention, FIG. 3(c) shows a perspective view of a third embodiment of the invention, similar to FIG. 3(b), but employing a stylus support having a square cross-section, and FIG. 3(d) shows a perspective view of still another embodiment, wherein the stylus support is rectangular and has a cut-out and mating insert piece.

DETAILED DESCRIPTION OF THE PREFERRED EMBODIMENTS

Referring to FIGS. 2 and 3(a), the embodiment shown therein comprises a stylus support 7 and a wire sleeve 8. FIG. 3(a) shows the opened stylus support in the form of a diagonally split polygonal cylinder wherein one edge thereof is hinged and the opposite surfaces are provided with mating male and female snap fasteners 9 and 10. A small-diameter cylindrical space 11 is formed in the center of the support at one end thereof, a large-diameter cylindrical space 12 is formed therein in the opposite end, and the shoulder 14 between the two spaces is perpendicular to the center axis of the stylus support.

The wire sleeve 8 is accomodated in the stylus support 7 in such a manner that a small-diameter portion 11' of the sleeve fits in the mating small-diameter space 11 formed in the support, a large-diameter portion 12' thereof fits in the mating large-diameter space 12, and the stepped surface 14' of the sleeve engages or abuts the shoulder 14. The small-diameter portion 11' is longer than the mating space 11, whereby it protrudes from the forward end of the stylus support after assembly.

A wire 15 of predetermined length is inserted into the sleeve, one end of the wire being fixed to the large-diameter end of the sleeve by staking, soldering, gluing or the like, and the opposite end being fixed to the end of the cantilevered stylus arm 18 and extending through a rubber damper ring 16.

The damper ring is made of a viscoelastic material and is arranged between a permanent magnet ring 17 mounted on the stylus arm and the stylus support 7. The protruding end of the wire sleeve 8 is inserted into a central aperture 19 of the damper ring, but is designed to be shorter than the depth of the aperture.

Therefore, insofar as the dimensions of the small-diameter and large-diameter spaces of the stylus support are accurate and in comformity with the dimensions of the respective parts of the wire sleeve, the same compressive stress will be applied to the respective damper rings of the mass produced pick-up cartridges by inserting a predetermined length of wire 15 into the sleeve 8, securing one end of the wire to the stylus arm 18 through the damper ring, securing the other end of the wire to the rear end of the sleeve, inserting the sleeve into the open stylus support 7, closing the latter, and snapping it shut. The assembled stylus support is accomodated in a holder 20 of polygonal cylindrical configuration which keeps the support closed and prevents the release of the sleeve. When the snap fasteners 9, 10 are engaged, a small amount of adhesive material may also be applied to the support for fixing purposes.

Further, by forming the sleeve 8 integral with the wire 15, as with nylon, for example, it is possible to further reduce the number of parts, whereby uniformly manufactured products of consistent quality can be obtained. The stylus support 7 can be inexpensively manufactured to close and consistent tolerances by forming it from a synthetic resin, such as nylon or the like.

FIG. 3(b) shows another embodiment of the invention wherein the stylus support 21 has a round or cylindrical shape, rather than a square or rectangular shape. In this embodiment, instead of the snap fasteners 9, 10, a stopper ring 22 is employed to hold the stylus support shut after the wire sleeve is assembled therein.

FIG. 3(c) shows still another embodiment of the invention, similar to that of FIG. 3(a), but wherein a square stopper ring 23 is employed to hold the stylus support shut or closed instead of snap fasteners.

Referring now to FIG. 3(d), still another embodiment is shown wherein the main body of the stylus support has a longitudinal recess 24 communicating with the central, cylindrical space configured to accomodate the wire sleeve. After the insertion of the wire sleeve, a mating cover member 25 is fitted into the recess 24 to thereby clamp the sleeve firmly in place. Thereafter, the square stopper ring is slipped over the end of the assembled stylus support. In this embodiment, the stylus support and the stopper ring have a rectangular configuration, but cylindrical shapes for these components are also applicable.

In the embodiments of FIGS. 3(b) to 3(d), the stylus supports are formed with recessed grooves around their forward peripheral edges to accomodate the installed stopper rings, as clearly shown in the drawings, whereby the assembled stylus supports may be smoothly received in the holders 20.

What is claimed is:

1. In a phonographic pick-up cartridge sub-assembly including a stylus support member having a generally cylindrical cavity therethrough; an elongated, generally cylindrical sleeve member disposed within the cavity; a stylus support wire axially disposed within the sleeve member, one end of the wire extending out of the sleeve member and being secured to one end of a cantilevered stylus arm, and the other end of the wire being secured within the sleeve member; a magnetic circuit element coaxially mounted to said one end of the stylus arm; and, resilient vibrational damping element disposed between the magnetic circuit element and the support member and adapted to be compressively stressed by tensioning the wire, the improvements characterized by:

(a) the support member being separable along a plane substantially parallel to the axis of said cylindrical cavity to expose said cavity therein, to thereby enable the insertion of the sleeve member into the cavity during assembly, (b) the support member defining abutment means in the cavity, and (c) the sleeve member defining abutment means thereon configured to mate with the support member abutment means, whereby the mating abutment means axially fix the inserted sleeve member within the support member so that for a predetermined wire length and damping element thickness, a desired wire tension and damping element compression may be maintained.

2. A pick-up cartridge as defined in claim 1, wherein said stylus support member is diagonally split and longitudinally hinged, and includes mating male and female snap fasteners on the opposite halves thereof for securing said support member together after the insertion of said sleeve member thereinto.

3. A pick-up cartridge as defined in claim 1, further comprising a stopper ring coaxially engagable around the periphery of the stylus support member for securing said support member together after the insertion of said sleeve member thereinto.

4. A pick-up cartridge as defined in claim 2, wherein the stylus support member has a polygonal cross-section.

5. A pick-up cartridge as defined in claim 3, wherein the stylus support member has a polygonal cross-section.

6. A pick-up cartridge as defined in claim 3, wherein the stylus support member has a circular cross-section.

7. A pick-up cartridge as defined in claim 3, wherein the stopper ring has a square configuration.

8. A pick-up cartridge as defined in claim 3, wherein the stylus support member has a recessed groove at one peripheral end thereof to accomodate said stopper ring.

9. A pick-up cartridge as defined in claim 1, further comprising a cover sleeve surrounding the assembled support member to retain it together.

10. A pick-up cartridge as defined in claim 1, wherein the support member comprises a main body piece having an axial groove therein corresponding to a longitudinal section of the cavity and extending inwardly to the cavity, and an insert piece configured to mate with the groove.

11. A pick-up cartridge as defined in claim 1, wherein the support member abutment means comprises an annular shoulder in the cavity formed by the interface between two different diameter portions thereof, and the sleeve member abutment means comprises a mating shoulder formed by the interface between two different diameter portions thereof.

12. A pick-up cartridge as defined in claim 10, wherein the support member abutment means comprises an annular shoulder in the cavity formed by the interface between two different diameter portions thereof, and the sleeve member abutment means comprises a mating shoulder formed by the interface between two different diameter portions thereof.

* * * * *